(12) United States Patent
Kim

(10) Patent No.: US 9,682,634 B2
(45) Date of Patent: Jun. 20, 2017

(54) METHOD AND SYSTEM FOR DETECTING CHARGER

(71) Applicant: Hyundai Motor Company, Seoul (KR)

(72) Inventor: Do Hoon Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 242 days.

(21) Appl. No.: 14/561,324

(22) Filed: Dec. 5, 2014

(65) Prior Publication Data

US 2016/0061982 A1 Mar. 3, 2016

(30) Foreign Application Priority Data

Aug. 27, 2014 (KR) .................. 10-2014-0112548

(51) Int. Cl.
| | | |
|---|---|---|
| *H01F 27/42* | (2006.01) | |
| *B60L 11/18* | (2006.01) | |
| *H04B 5/00* | (2006.01) | |
| *H02J 50/80* | (2016.01) | |
| *H02J 50/40* | (2016.01) | |
| *G01V 3/10* | (2006.01) | |

(52) U.S. Cl.
CPC ......... *B60L 11/1848* (2013.01); *B60L 11/182* (2013.01); *B60L 11/1809* (2013.01); *G01V 3/10* (2013.01); *H02J 50/40* (2016.02); *H02J 50/80* (2016.02); *H04B 5/0037* (2013.01); *H04B 5/0081* (2013.01)

(58) Field of Classification Search
CPC .............. B60L 11/1846; B60L 11/1842; B60L 11/1838
See application file for complete search history.

(56) References Cited

U.S. PATENT DOCUMENTS

2014/0070764 A1\* 3/2014 Keeling ................. H02J 50/50 320/108

FOREIGN PATENT DOCUMENTS

| JP | 2013-198214 A | 9/2013 |
|---|---|---|
| JP | 2013-247796 A | 12/2013 |

\* cited by examiner

*Primary Examiner* — Daniel Cavallari
(74) *Attorney, Agent, or Firm* — Mintz Levin Cohn Ferris Glovsky and Popeo, P.C.; Peter F. Corless

(57) ABSTRACT

A method and system for detecting a charger are provided. The method includes receiving, by a controller, charger information from at least one charger present within a network area of a vehicle. A sensed current is then transmitted from a receiving pad of the vehicle to the charger or a charger side transmitting pad based on the charger information. Further, the method may include detecting the charger and the transmitting pad having priority based on a voltage and a current induced by the sensed current.

17 Claims, 3 Drawing Sheets

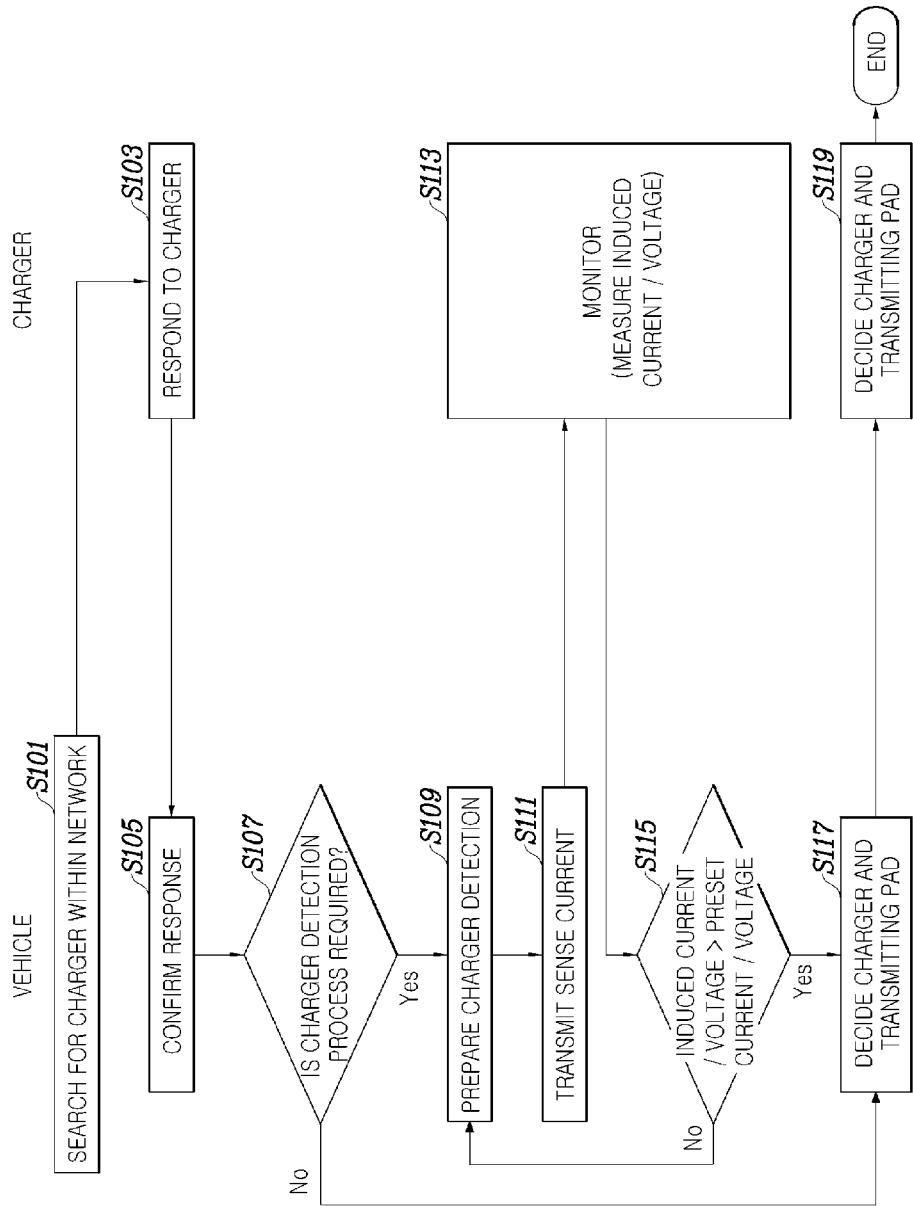

METHOD AND SYSTEM FOR DETECTING CHARGER

CROSS REFERENCE TO RELATED APPLICATION(S)

The present application claims priority to Korean Patent Application Number 10-2014-0112548 filed on Aug. 27, 2014, the entire contents of which application are incorporated herein by reference.

BACKGROUND

Technical Field

The present invention relates to a method and system for detecting a charger, and more particularly, to a method and system for detecting a charger for a designated vehicle based on the circumstances, such as the number of chargers.

Description of the Related Art

Recently, technology related to plug-in hybrid vehicles and electric vehicles has rapidly developed. Some or all of driving force for these vehicles is electric energy. Both wired and wireless charging methods for the plug-in hybrid and electric vehicles have been developed.

Currently, a vehicle may recognize a wireless charger in the vicinity of (e.g., near) the vehicle when the vehicle approaches a wireless charger. However, a vehicle may not select and use a specific charger or charging pad when a plurality of chargers or charging pads are available.

SUMMARY

An objective of the present invention provides a method and system for detecting a charger that is most suitable for a vehicle within a charging station, in which a plurality of chargers or charging pads are mounted.

According to an exemplary embodiment of the present invention, a method for detecting a charger may include: receiving, by a controller, charger information from at least one charger present within a network area of a vehicle; transmitting, by the controller, a sensed current from a receiving pad of the vehicle to the charger or a charger side transmitting pad based on the charger information; and detecting, by the controller, the charger and the transmitting pad having priority based on a voltage and a current induced by the sensed current. In the reception of the charger information, at least one selected from the group consisting of: charger information regarding a unique identifier of the at least one charger or transmitting pad, a number of chargers, a number of transmitting pads per the charger, an availability of the chargers, and a type of the transmitting pad of the charger may be received.

The method may further include: selecting, by the controller, one charger as a charger for the vehicle when one charger is detected or available. In addition, the method may include: transmitting, by the controller, information regarding a current, a voltage, power, duration or start time from the receiving pad of the vehicle to the plurality of chargers or transmitting pads. Further, method may include: measuring, by the controller, the voltage and the current induced from each of the plurality of chargers or transmitting pads based on the transmitted sensed current within the charger.

In the detection of the charger and the transmitting pad that has priority based on a voltage and a current induced by the sensed current, the charger and the transmitting pad with a voltage and current induced by the sensed current equal to or greater than a preset magnitude may be detected.

BRIEF DESCRIPTION OF THE DRAWINGS

The above and other objects, features and advantages of the present invention will be more clearly understood from the following detailed description taken in conjunction with the accompanying drawings, in which:

FIG. 1 is an exemplary flow chart schematically illustrating a method for detecting a charger within a charging system according to an exemplary embodiment of the present invention;

DETAILED DESCRIPTION

Figure 2A:
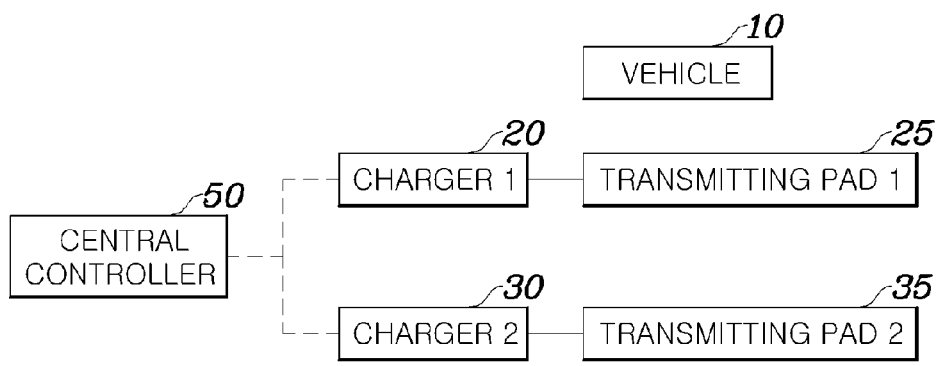
FIGS. 2A and 2B are exemplary diagrams illustrating detecting an optimal charger or charging pad when a plurality of chargers or charging pads are mounted according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Specifically, structural and functional descriptions in exemplary embodiment of the present invention disclosed in the present specification or the present application are illustrated to describe exemplary embodiments of the present invention and therefore, the exemplary embodiments of the present invention may be practiced in various forms and are not to be construed as being limited to the exemplary embodiment of the present invention disclosed in the present specification or the present application.

The exemplary embodiments of the present invention may be variously modified and have various forms and therefore specific exemplary embodiments are illustrated in the accompanying drawings and will be described in detail in the present specification or the present application. However, it is to be understood that the present invention is not limited to the specific exemplary embodiments, but includes all modifications, equivalents, and substitutions included in the spirit and the scope of the present invention.

Terms such as 'first', 'second', etc., may be used to describe various components, but the components are not to be construed as being limited to the terms. The terms are used only to distinguish one component from another component. For example, the 'first' component may be named the 'second' component and the 'second' component may also be similarly named the Tine component, without departing from the scope of the present invention.

It is to be understood that when one element is referred to as being "connected to" or "coupled to" another element, it may be connected directly to or coupled directly to another element or be connected to or coupled to another element, having the other element intervening therebetween. On the other hand, it is to be understood that when one element is referred to as being "connected directly to" or "coupled directly to" another element, it may be connected to or coupled to another element without the other element intervening therebetween. Other expressions describing a relationship between components, that is, "between", "directly between", "neighboring to", "directly neighboring to" or the like, should be similarly interpreted.

Unless indicated otherwise, it is to be understood that all the terms used in the specification including technical and scientific terms have the same meaning as those that are understood by those skilled in the art. It may be understood that the terms defined by the dictionary are identical with the meanings within the context of the related art, and they should not be ideally or excessively formally defined unless the context clearly dictates otherwise.

Hereinafter, exemplary embodiments of the present invention will be described in detail with reference to the accompanying drawings. Like reference numerals proposed in each drawing denote like components.

FIG. 1 is an exemplary flow chart schematically illustrating a method for detecting a charger within a charging system according to an exemplary embodiment of the present invention. Referring to FIG. 1, the method for detecting a charger according to the exemplary embodiment of the present invention may search for a charger present within a network area, which may be detected by a vehicle (S101). In other words, a signal confirming whether the charger is present within the network area may be transmitted to a charger. When the charger, which may be present within the network area of the vehicle, transmits charger information in response to the signal (S103) and the vehicle receives the charger information (S105), a sensed current may be transmitted from a receiving pad to the charger or a charger transmitting pad based on the charger information (S111).

The charger and the transmitting pad that has priority may be determined based on a voltage or a current induced by the sensed current transmitted from the vehicle (S117 and S119). When the vehicle detects the charger and the transmitting pad (S117), the vehicle may transmit that information to the charger and the charger may also detect the charger and the transmitting pad (S119).

More particularly, the charger information received from the charger may include a unique identifier (ID) of a charger, a number of chargeable transmitting pads, an availability of the transmitting pad a type (e.g., singular or double) of the transmitting pad, a number of transmitting pads per charger, and the like. The unique identifier of the charger may be a Mac address within the Ethernet. Whether a charger detection process, which helps a vehicle detect an optimal charger, is required may be determined (S107).

When one charger or transmitting pad is available or detected, the charger detection process may be determined to be unnecessary and a controller may be configured to select the corresponding charger and transmitting pad as a charger for a vehicle (S117). In addition, communication with the selected charger may be established. Alternatively, when more than one charger or transmitting pad is detected, the charger detection process (S109 to S115), which detects the optimal charger for the corresponding vehicle, may be executed.

When the charger detection process is executed, the controller may be configured to transmit information regarding a current, a voltage, power, duration, or start time from the receiving pad of the vehicle to the plurality of chargers or transmitting pads to prepare the charger detection (S109). Additionally, the vehicle controller may be configured to transmit a minimal sensed current (e.g., enough to induce a voltage from the transmitting pad to the charger or the transmitting pad) (S111). The minimal sensed current may be a current of about $\frac{1}{10}$ of a normal current value which is transmitted in a normal state (e.g., when a vehicle operates without detecting a charger or charging pad).

The charger measures the current and the voltage induced from each transmitting pad and monitors the measured current and voltage (S113). In addition, the charger may be configured to transmit the measured induced current and voltage to the vehicle. For example, when one charger has a plurality of transmitting pads, the charger may indicate from which one of the transmitting pads the current, voltage, and power values are from and may transmit the indicated value to the vehicle. Further, the controller may be configured to compare the induced current, voltage, and power with a preset current, voltage, and power (S115) to determine the charger and the transmitting pad that has priority when the induced current, voltage, and power are greater than the preset value (S117). In other words, when the magnitude of the induced current, voltage, and power is greater than the preset value, the corresponding charger may be set as a charger for a vehicle and may increase charging efficiency.

Further, to reflect a distance between the vehicle and the charger or the transmitting pad, signal attenuation from the charger or the transmitting pad may also be determined. Accordingly, when more than one charger or transmitting pad is present where the induced current, voltage, and power are greater than the preset values for each of the chargers and the transmitting pads, the signal attenuation from the charger may be determined. Further, the charger and the transmitting pad may be selected based on a physical distance between the charger or the transmitting pad and the vehicle.

Figure 2B:
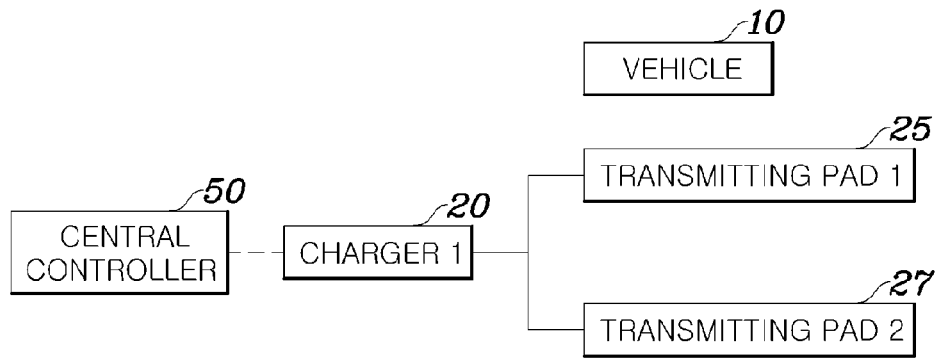
Figure 3A:
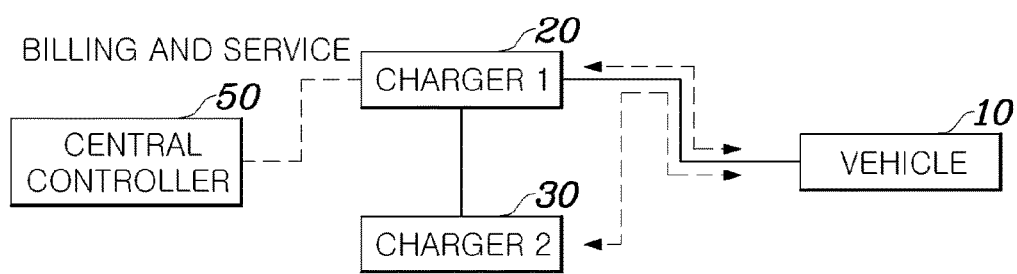
FIGS. 3A and 3B are exemplary diagrams illustrating detecting an optimal charger based on signal attenuation from a plurality of chargers and an example of detecting an available charger according to an exemplary embodiment of the present invention.
Figure 3B:
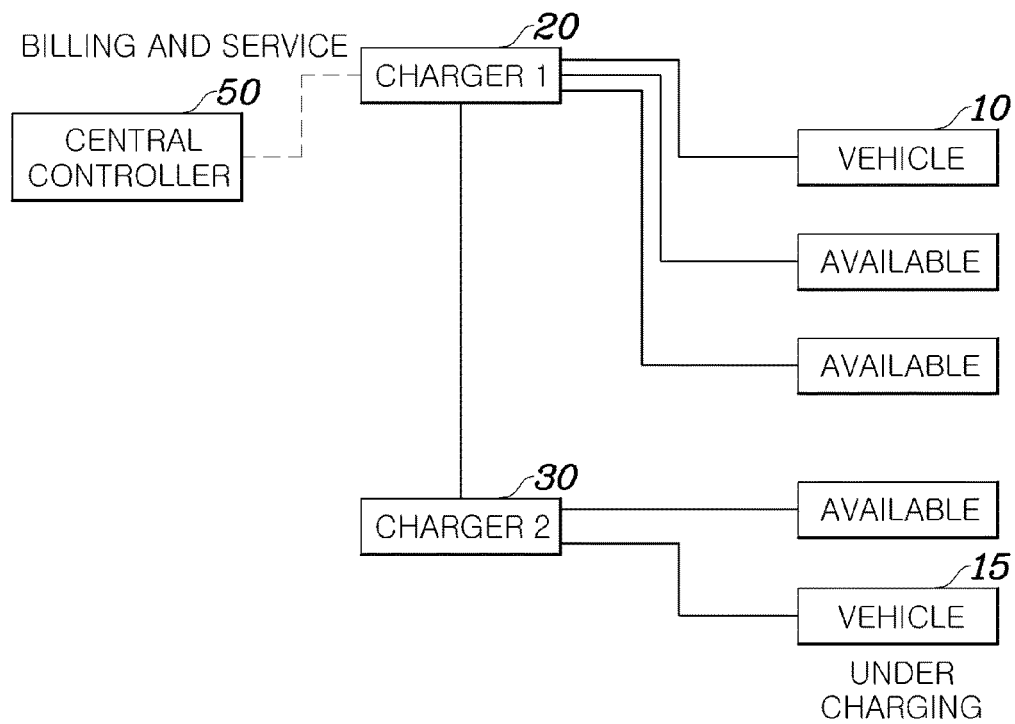

FIGS. 2A and 2B are exemplary diagrams illustrating detecting an optimal charger or charging pad when a plurality of chargers or charging pads are mounted in a charging station according to an exemplary embodiment of the present invention. FIGS. 3A and 3B are exemplary diagrams illustrating detecting an optimal charger based on signal attenuation from a plurality of chargers and an example of detecting an available charger according to an exemplary embodiment of the present invention.

The chargers in the charging system may be connected to each other via a smart grid and a central controller 50 may be configured to operate the plurality of chargers via power line communication. Referring to FIG. 2A, when the plurality of chargers 20 and 30 are mounted in parallel within a public parking lot, the vehicle 10 may be configured to detect the identifier information of the charger which is present within the network area. In other words, the vehicle may not appreciate which one of the chargers the vehicle is charging the vehicle or which one of the chargers is located at a shortest distance from the vehicle.

Referring to FIG. 2B, when two transmitting pads 25 and 27 that belong to one charger 20 are detected, which one of the transmitting pads optimally charges the vehicle may be determined and then a connection between the determined transmitting pads 25 and 27 and the receiving pads of the vehicle may be set up.

Referring to FIG. 3A, which one of the chargers 20 and 30 the vehicle 10 is nearest based on the attenuation of the signal transmitted from the chargers 20 and 30 may be determined. Further, as illustrated in FIG. 3B, when the plurality of chargers 20 and 30 and the plurality of transmitting pads in each charger are mounted in a charging station, the vehicle may be configured to receive the information regarding the available chargers and transmitting pads to detect the optimal charger and transmitting pad.

According to the exemplary embodiments of the present invention, the method for detecting a charger may determine the charger or the charging pad with an optimal efficiency, located nearest to the vehicle, or may be used based on driver intention, when charging the vehicle in the charging station in which the plurality of chargers or the plurality of charging pads are mounted and may charge the vehicle using the detected charger.

Although the present invention has been described with reference to the exemplary embodiments shown in the accompanying drawings, they are only examples. It will be appreciated by those skilled in the art that various modifications and equivalent other exemplary embodiments are possible from the present invention. Accordingly, an actual technical protection scope of the present invention is to be defined by the following claims.

What is claimed is:

1. A method for detecting a charger, comprising:
   receiving, by the controller, charger information from at least one charger present within a network area of a vehicle;
   transmitting, by the controller, a sensed current from a receiving pad of the vehicle to the charger or a charger side transmitting pad based on the charger information; and
   determining, by the controller, the charger and the transmitting pad that has priority based on a voltage and a current induced by the sensed current.

2. The method of claim 1, wherein in the reception of the charger information, the charger information includes at least one selected from the group consisting of: a unique identifier of the at least one charger or transmitting pad, a number of chargers, a number of transmitting pads per the charger, an availability of the charger, and a type of the transmitting pad of the charger.

3. The method of claim 1, further comprising:
   selecting, by the controller, one charger as a charger for the vehicle when the number of chargers detected is one.

4. The method of claim 1, further comprising:
   transmitting, by the controller, information regarding a current, a voltage, a power, a duration, or a start time from the receiving pad of the vehicle to the plurality of chargers or transmitting pads.

5. The method of claim 1, further comprising:
   measuring, by the controller, a voltage and a current induced from each of the plurality of chargers or transmitting pads based on the transmitted sensed current within the charger.

6. The method of claim 1, wherein the determination of the charger and the transmitting pad that has priority based on the voltage and the current induced by the sensed current includes:
   determining, by the controller, the charger and the transmitting pad with a voltage and a current induced by the sensed current is equal to or greater than a preset magnitude.

7. A system for detecting a charger, comprising:
   a memory configured to store program instructions; and
   a controller configured to execute the program instructions, the program instructions when executed configured to:
   receive charger information from at least one charger present within a network area of a vehicle;
   transmit a sensed current from a receiving pad of the vehicle to the charger or a charger side transmitting pad based on the charger information; and
   determine the charger and the transmitting pad that has priority based on a voltage and a current induced by the sensed current.

8. The system of claim 7, wherein the charger information includes at least one selected from the group consisting of:
   a unique identifier of the at least one charger or transmitting pad; the number of chargers; the number of transmitting pads for the charger; the availability of the charger; and a type of the transmitting pad of the charger.

9. The system of claim 7, wherein the controller is further configured to:
   select one charger as a charger for the vehicle when the number of chargers available or determined is one.

10. The system of claim 7, wherein the controller is further configured to:

transmit information regarding a current, a voltage, a power, a duration, or start time to the plurality of chargers or transmitting pads.

11. The system of claim 7, wherein the controller is further configured to:
measure a voltage and a current induced from each of the plurality of chargers or transmitting pads depending on the transmitted sensed current.

12. The system of claim 7, wherein in the determining of the charger and the transmitting pad that has priority based on the voltage and the current induced by the sensed current, the controller is further configured to:
determine the charger and the transmitting pad whose magnitude of the voltage and the current induced by the sensed current is equal to or greater than a preset magnitude.

13. A non-transitory computer readable medium containing program instructions executed by a controller, the computer readable medium comprising:
program instructions that receive charger information from at least one charger present within a network area of a vehicle;
program instructions that transmit a sensed current from a receiving pad of the vehicle to the charger or a charger side transmitting pad based on the charger information; and
program instructions that determine the charger and the transmitting pad that has priority based on a voltage and a current induced by the sensed current.

14. The non-transitory computer readable medium of claim 13, further comprising:
program instructions that selecting, by the controller, one charger as a charger for the vehicle when the number of chargers available or determined is one.

15. The non-transitory computer readable medium of claim 13, further comprising:
program instructions that transmitting, by the controller, information regarding a current, a voltage, a power, a duration or a start time to the plurality of chargers or transmitting pads.

16. The non-transitory computer readable medium of claim 13, further comprising:
program instructions that measure a voltage and a current induced from each of the plurality of chargers or transmitting pads depending on the transmitted sensed current.

17. The non-transitory computer readable medium of claim 13, program instructions that determine the charger and the transmitting pad that has priority based on a voltage and a current induced by the sensed current further includes:
program instructions that determine the charger and the transmitting pad whose magnitude of the voltage and the current induced by the sensed current is equal to or greater than a preset magnitude.

* * * * *